Maurice Lang
Renato Di Pasquale
INVENTORS.

BY Karl J. Ross
Attorney

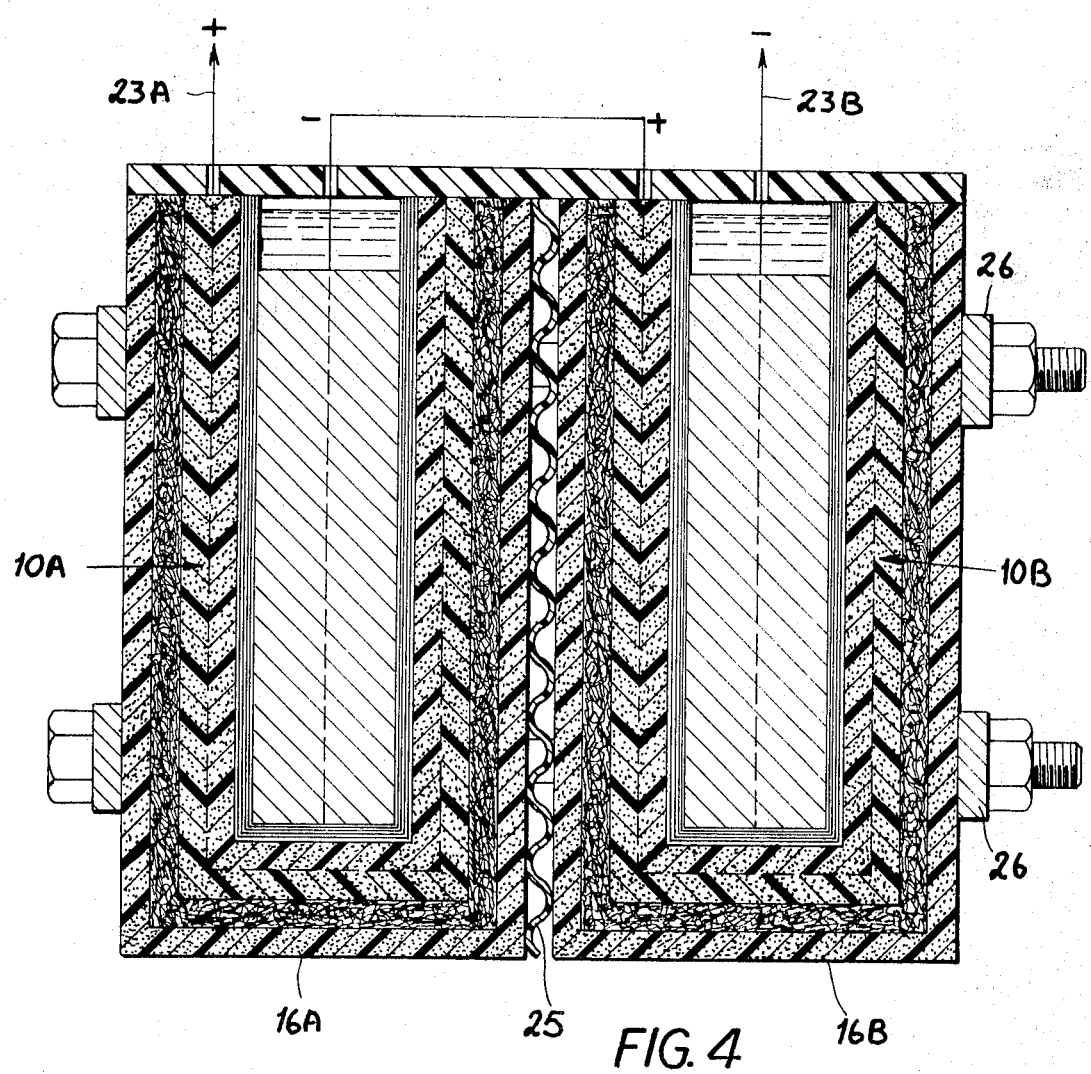
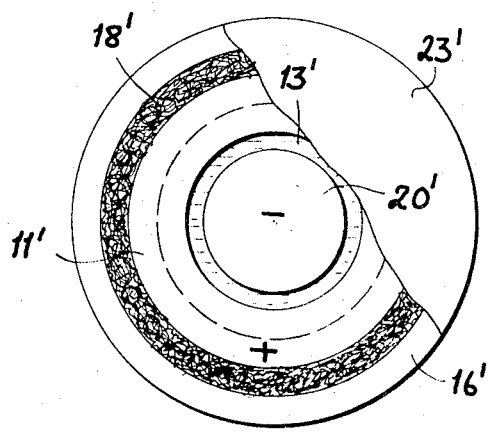
FIG. 4
FIG. 5
Maurice Lang
Renato Di Pasquale
INVENTORS.
BY
Karl F. Ross
Attorney

United States Patent Office 3,594,234
Patented July 20, 1971

---

3,594,234
AIR DEPOLARIZED FUEL CELL
Maurice Lang, Massapequa, N.Y., and Renato Di Pasquale, Paramus, N.J., assignors to Yardney International Corporation, New York, N.Y.
Filed Aug. 23, 1968, Ser. No. 754,797
Int. Cl. H01m 29/04
U.S. Cl. 136—86                                 16 Claims

ABSTRACT OF THE DISCLOSURE

An air-depolarized fuel cell with a metal electrode in a gas-permeable envelope electrode of microporous carbon-Teflon mixture, containing an alkaline electrolyte, is surrounded by a shell of microporous Teflon closely spaced from the envelope electrode by a small clearance designed to receive products of interaction of carbon dioxide with the electrolyte.

---

Our present invention relates to fuel cells of the air-depolarized type having a (usually metallic) inner electrode received in a gas-permeable outer envelope electrode, e.g. as described in commonly assigned application Ser. No. 664,151 filed Aug. 21, 1967 by Renato Di Pasquale and Frank Solomon.

The envelope electrode of such a fuel cell generally comprises a catalytically active agent incorporated in a microporous matrix of more or less hydrophobic resinous material, e.g. polytetrafluoroethylene (Teflon). The catalyst, which consist of carbon particles with or without a metallic (e.g. platinum) coating, may be admixed for this purpose with an aqueous Teflon emulsion to form a paste which is then dried at a temperature of about 60° to 250° C. whereupon the dry mixture is cured by heating it at a temperature of about 150° to 350° C. in the substantial absence of air; a thermally destructible filler such as a glycol, which vaporizes at the curing temperature without leaving an undesirable residue in the resulting sinter body, is included in the mixture to ensure the desired porosity and permeability to gases. Generally, the weight ratio of plain or metallized carbon to Teflon may range between about 10:1 and 1:1, depending on the desired degree of wettability. Reference in this connection may be made to another commonly assigned application, Ser. No. 601,546 filed Dec. 14, 1966 by Allen Charkey and Renato Di Pasquale.

As noted in our co-pending application Ser. No. 747,634 filed July 1, 1968, a relatively hydrophilic carbon/Teflon layer and a relatively hydrophobic layer of reduced carbon content may be laminated together with interposition of a perforate conductor, such as a nickel grid, with the more hydrophilic surface directed outwardly to face the oncoming air flow and the more hydrophobic side directed inwardly to contact the liquid electrolyte surrounding the inner counterelectrode. With a counterelectrode made of zinc, for example, and an alkaline electrolyte (e.g. of potassium hydroxide), the catalytic action of the carbon imbedded in the Teflon matrix ionizes the oncoming oxygen upon contact with the electrolyte to form hydroxyl ions which migrate toward the zinc electrode and oxidize the latter while generating a potential difference between this electrode and the imbedded conductor of the enveloping outer electrode. The hydrophobic outer layer prevents the electrolyte from penetrating the envelope for more than a fraction of its thickness so that the interaction between the air flow and the electrolyte takes place primarily within the interstices of the Teflon/carbon matrix. We have found, however, that upon prolonged operation these interstices may become clogged by products of reaction of carbon dioxide or other impurities with the electrolyte. Thus, potassium carbonate may deposit within the tiny pores of the envelope and impede the further admission of oxygen to its interior.

It is, therefore, the general object of our present invention to provide an improved fuel-cell construction which avoids such contamination and clogging.

In accordance with our present invention, the aforestated object is realized by the provision of a microporous shell surrounding the envelope electrode with small clearance, defining therewith a space in which potassium carbonate and similar reaction products may be harmlessly deposited. This clearance is advantageously occupied by a microporous spacer, such as a web, mat or fabric of synthetic fibers (e.g. Pellon), and may have a width ranging from a fraction of a millimeter to several millimeters.

If the outer surface of the envelope electrode is sufficiently hydrophilic to permit the liquid electrolyte to reach that surface, the electrolytic film or droplets present in the aforementioned clearance will intercept the arriving carbon dioxide and react with it to form carbonates that are retained within the microporous spacer and do not materially impede the entry of oxygen into the interstices of the envelope electrode. This electrode, in fact, could be made of uniform composition throughout its thickness, e.g. with a proportion of 20 to 40 parts by weight of Teflon for 100 parts of carbon. The surrounding shell, on the other hand, should be completely hydrophobic, consisting preferably of 100% Teflon.

The invention will be described in greater detail with reference to the accompanying drawing in which:

FIG. 4 is a view similar to FIG. 3, showing a modification; and

FIG. 5 is a top view (partly broken away) of another fuel cell according to the invention.

Figure 1:
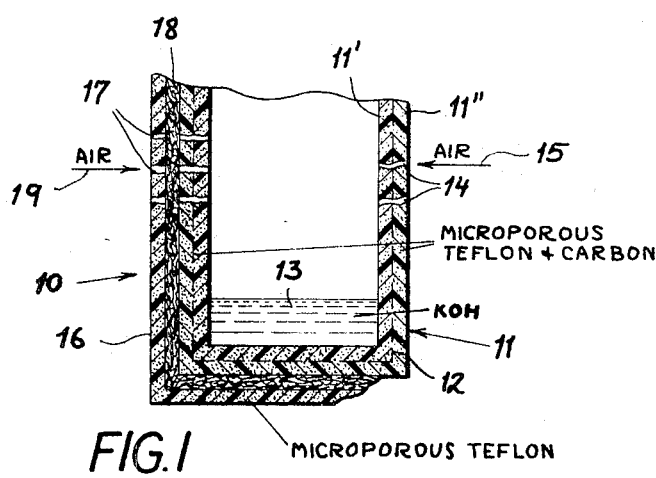
FIG. 1 is a fragmentary cross-sectional view of a fuel cell embodying our present improvement.

In FIG. 1 we have illustrated part of a fuel cell 10 embodying our present invention. The cell includes an envelope electrode 11 with an imbedded metallic grid 12; the electrode layers 11', 11" bracketing this grid may consist of different mixtures of carbon and Teflon, with a lower percentage of Teflon in the inner layer 11' and a higher percentage thereof in the outer layer 11". An alkaline electrolyte 13, here an aqueous solution of potassium hydroxide, contacts the inner layer 11' as well as a metallic counterelectrode not shown in FIG. 1. Some of the interstices of the microporous electrode 11 have been indicated somewhat diagrammatically at 14.

If air from the surrounding atmosphere passes directly through the interstices 14 as indicated by arrow 15, its oxygen interacts with the electrolyte in the pores 14, as will its carbon dioxide; the latter reaction results in the formation of an insoluble carbonate tending to clog the pores 14. In accordance with our invention, therefore, we provide an outer shell 16 of microporous Teflon having interstices diagrammatically indicated at 17; a microporous spacer 18, preferably of filamentary material, occupies the narrow clearance separating the shell 16 from the electrode 11.

If, as indicated by arrow 19, the oncoming air stream must first traverse the interstices 17 of shell 16 before reaching the envelope 11, and if the Teflon content of layer 11" is low enough (e.g. not more than 40 parts by weight for 100 parts of carbon) to permit some wetting of the outer electrode surface by the liquid 13, the formation of carbonates will take place within the relatively wide passages of spacer 18 so that carbonates formed by the arriving carbon dioxide will not enter and clog the pores 14 of the envelope 11.

Figure 3:
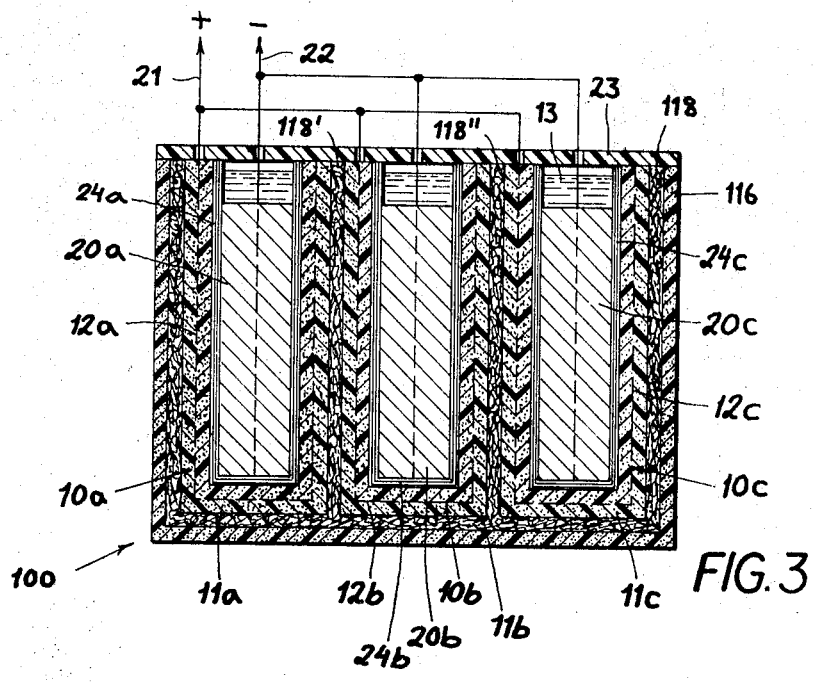
FIG. 3 is a longitudinal sectional view of the battery of FIG. 2, taken on the line III—III thereof.
Figure 2:
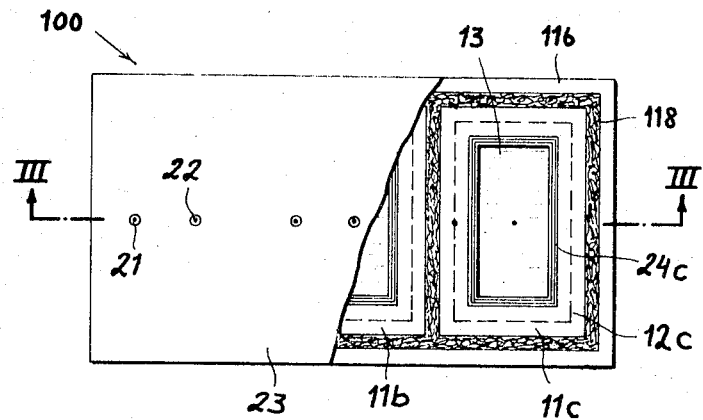
FIG. 2 is a top view (partly broken away) of a battery incorporating several fuel cells of the type shown in FIG. 1.

In FIGS. 2 and 3 we have shown a battery 100 incorporating several fuel cells 10a, 10b, 10c of the construction described in connection with FIG. 1, each of these cells also comprising an inner electrode or anode 20a, 20b, 20c (e.g. of zinc). Terminal leads 21 and 22 emanate from the grids 12a, 12b, 12c of the respective envelope electrodes 11a, 11b, 11c of the cell, these envelope electrodes being surrounded by a common outer shell 116 separated therefrom by filamentary spacer material 118. Leads 21 and 22, shown connected in parallel to the several cathodes and anodes, respectively, pass through an insulating cover 23 overlying the shell 116. The spacer material 118 also forms layers 118', 118'' between the envelopes 11a, 11b, and 11b, 11c of adjoining cells to facilitate the entrance of air therebetween. Each of the inner electrodes 20a, 20b, 20c is wrapped in a respective separator 24a, 24b, 24c consisting of one or more layers of permeable or semipermeable sheet material (e.g. cellophane).

In FIG. 4 we have shown a battery with two fuel cells 10A and 10B, each similar to the cells of FIGS. 3 and 4 but provided with individual microporous shells 16A, 16B. The two shells are separated from each other by a solid spacer 25 forming air channels therebetween, such as a corrugated sheet of synthetic resin, reference being made in this conection to our aforementioned copending application disclosing a variety of such spacers. The cells are series-connected via individual terminal leads 23A, 23B and are held together, under suitable clamping pressure, by a yoke 26.

FIG. 5 illustrates an adaptation of the principles of our invention to a fuel cell of the coaxial cylindrical type. A central zinc electrode 20' is surrounded by liquid electrolyte 13' within an evelope electrode 11', the latter being coaxially encased by a microporous shell 16' with a narrow clearance receiving an annular spacer 18'; an overlying lid is partially shown at 23'. Electrode 20' may be surrounded, if necessary, by separator material as discussed above. In this embodiment, too, the radial width of the annular clearance separating electrode 11' and shell 16' may range from about 0.5 mm to 2 or 3 mm.

Naturally, any number of feul cells of the type herein disclosed may be combined in a battery, with their terminals connected either in parallel (FIG. 3) or in series (FIG. 4), within a common outer shell or within individual outer shells of the character herein set forth. The invention can also be extended to related chemical energy generators of this general type wherein a depolarizing gas is admixed with impurities giving rise to undesirable reaction products.

Although carbon has been described as a preferred catalyst, other known catalytically active materials such as silver (possibly alloyed with mercury), nickel or copper may also be used.

Furthermore, the counterelectrode or anode may also be of the gas-depolarized type instead of being constituted by a body of oxidizable metal.

We claim:

1. An air-depolarized fuel cell comprising an envelope electrode of microporous sheet material containing a catalytically effective agent;
   a liquid electrolyte in said envelope;
   a counterelectrode immersed in said electrolyte;
   a microporous shell less wettable by said electrolyte than said envelope electrode surrounding the latter with small clearance whereby ambient air can reach said electrolyte by successively penetrating said shell and said envelope electrode;
   a microporous spacer of filamentary structure occupying said clearance;
   and terminal connections to said envelope electrode and said counterelectrode.

2. A fuel cell as defined in claim 1 wherein said agent is carbon, said sheet material consisting of a mixture of carbon with a relatively hydrophobic substance, said shell consisting substantially exclusively of said relatively hydrophobic substance.

3. A fuel cell as defined in claim 2 wherein said relatively hydrophobic substance is polytetrafluoroethylene.

4. An air-depolarized fuel cell comprising an envelope electrode of microporous sheet material containing a catalytically effective agent;
   a liquid electrolyte in said envelope;
   a counterelectrode immersed in said electrolyte;
   a microporous shell less wettable by said electrolyte than said envelope electrode surrounding the latter with a small clearance hanging between a fraction of a millimeter and several millimeters whereby ambient air can reach said electrolyte by successively penetrating said shell and said envelope electrode;
   and terminal connections to said envelope electrode and said counterelectrode.

5. A fuel cell as defined in claim 4 wherein said agent is carbon, said sheet material consisting of a mixture of carbon with a relatively hydrophobic substance, said shell consisting substantially exclusively of said relatively hydrophobic substance.

6. A fuel cell as defined in claim 5 wherein said relatively hydrophobic substance is polytetrafluoroethylene.

7. An air-depolarized fuel cell comprising an envelope electrode of micrporous sheet material containing a catalytically effective agent admixed with a relatively hydrophobic substance;
   a liquid electrolyte in said envelope;
   a counterelectrode immersed in said electrolyte;
   a microporous shell less wettable by said electrolyte than said envelope electrode surrounding the latter with small clearance whereby ambient air can reach said electrolyte by successively penetrating said shell and said envelope electrode, said shell consisting substantially exclusively of said relatively hydrophobic substance;
   and terminal connections to said envelope electrode and said counterelectrode.

8. A fuel cell as defined in claim 7 wherein said agent is carbon.

9. A fuel cell as defined in claim 8 wherein said relatively hydrophobic substance is polytetrafluoroethylene.

10. A fuel cell as defined in claim 9 wherein said mixture consists of substantially 20 to 40 parts, by weight, of polytetrafluoroethylene for 100 parts of carbon.

11. A fuel cell as defined in claim 7 wherein said electrolyte is an alkaline solution.

12. A fuel cell as defined in claim 7, further comprising a microporous spacer occupying said clearance.

13. A fuel cell as defined in claim 12, wherein said spacer is a filamentary structure.

14. A fuel cell as defined in claim 7 wherein said clearance has a width ranging between a fraction of a millimeter and several millimeters.

15. An electric battery comprising a plurality of juxtaposed fuel cells as defined in claim 7.

16. A battery as defined in claim 15 wherein said shell is common to all said fuel cells.

References Cited

UNITED STATES PATENTS

| | | | |
|---|---|---|---|
| 3,297,484 | 1/1967 | Niedrach | 136—86 |
| 3,378,406 | 4/1968 | Rosansky | 136—86 |
| 3,462,307 | 8/1969 | Voorhies et al. | 136—86 |
| 3,457,113 | 7/1969 | Deibert | 136—86 |

FOREIGN PATENTS

| | | | |
|---|---|---|---|
| 393,332 | 10/1908 | France | 136—86A |

ALLEN B. CURTIS, Primary Examiner